US006619601B1

(12) United States Patent
Vall

(10) Patent No.: US 6,619,601 B1
(45) Date of Patent: Sep. 16, 2003

(54) SUPPORT FOR TABLE, PLATFORM OR THE LIKE

(76) Inventor: Robert A. Vall, 603 Parkside Blvd., Cleveland, OH (US) 44143-2813

( * ) Notice: Subject to any disclaimer, the term of this patent is extended or adjusted under 35 U.S.C. 154(b) by 0 days.

(21) Appl. No.: 10/179,125

(22) Filed: Jun. 25, 2002

(65) Prior Publication Data (65)

(51) Int. Cl.[7] .............................................. F16M 11/16
(52) U.S. Cl. .................................. 248/188; 108/158.12
(58) Field of Search ............................. 248/188, 188.1, 248/188.2, 188.8, 188.9; 108/158.12

(56) References Cited

U.S. PATENT DOCUMENTS

| | | |
|---|---|---|
| 110,013 A | 12/1870 | Cougle |
| 169,764 A | 11/1875 | Beaver |
| 274,614 A | 3/1883 | Kelly |
| 288,126 A | 11/1883 | Shearman |
| 290,128 A | 12/1883 | Smith et al. |
| 359,457 A | 3/1887 | Mitchell |
| 1,154,692 A | 9/1915 | Dehullu |
| 1,266,104 A | 5/1918 | Carlsberg |
| 2,552,286 A | 5/1951 | Kompass |
| 2,657,964 A | * 11/1953 | Watrous ................ 108/157.17 |
| 2,893,164 A | * 7/1959 | Martin ..................... 248/188.2 |
| 3,339,920 A | 9/1967 | Moritz ......................... 272/60 |
| 3,887,288 A | 6/1975 | Glaser ........................ 403/219 |
| 4,105,201 A | 8/1978 | L'Ecuyer et al. ........... 272/111 |
| 4,182,432 A | 1/1980 | Cossitt ........................ 182/151 |
| 4,300,455 A | 11/1981 | Ornati ......................... 108/156 |
| 4,662,591 A | * 5/1987 | Encontre .................... 248/188 |
| 4,724,642 A | 2/1988 | Hoffman et al. .............. 52/298 |
| 4,854,531 A | 8/1989 | Esposito ..................... 248/165 |
| 4,879,800 A | 11/1989 | Rumman ..................... 29/450 |
| 5,101,932 A | 4/1992 | Trudgeon ................... 182/129 |
| 5,392,575 A | 2/1995 | Hoffman et al. .............. 52/299 |
| 5,647,286 A | * 7/1997 | Dunn .................... 108/147.21 |
| 5,953,874 A | 9/1999 | Hoffman et al. .............. 52/299 |
| 6,012,185 A | * 1/2000 | Woods et al. ................ 5/509.1 |

* cited by examiner

Primary Examiner—Ramon O. Ramirez
(74) Attorney, Agent, or Firm—Mark Kusner; Michael A. Jaffe

(57) ABSTRACT

A molded, plastic support having an upper end and a lower end. The upper end has an outer profile and is molded to have a pair of intersecting, rectangular slots formed therein. The lower end has an outer profile greater than the outer profile of the upper end, wherein the support tapers outwardly from the upper end to the lower end. The support is hollow, and the lower end is open to expose a hollow inner cavity. The support has a height of at least 20 inches.

16 Claims, 3 Drawing Sheets

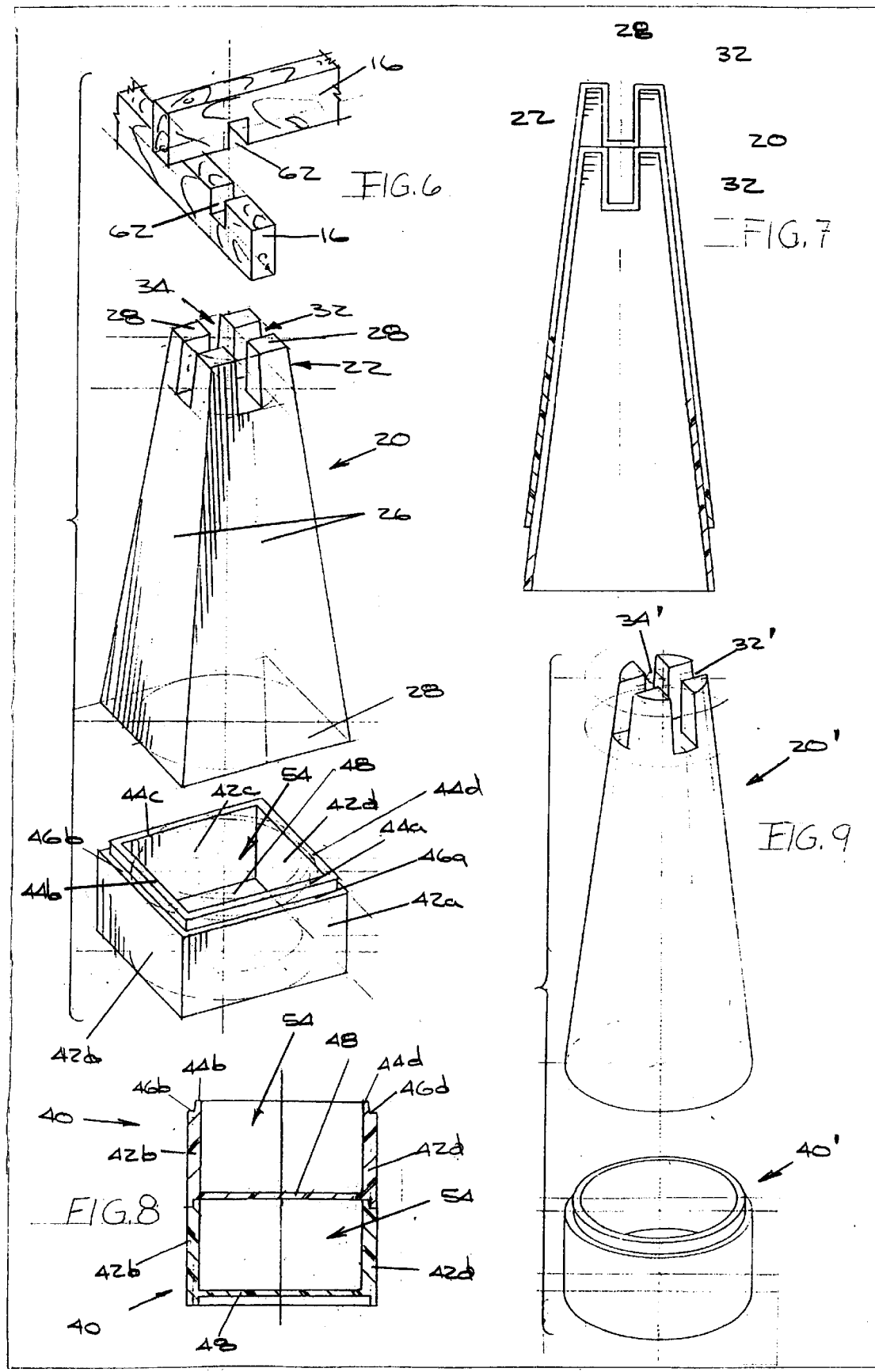

SUPPORT FOR TABLE, PLATFORM OR THE LIKE

FIELD OF THE INVENTION

The present invention relates generally to support structures, and more particularly to a pedestal-like support for supporting a frame member for a table, platform or the like that may be used as a work surface or display surface.

BACKGROUND OF THE INVENTION

Most tables or support platforms are made of various materials wherein legs or supports are attached to an edge or bottom surface of the table top by means of suitable fasteners, such as screws, nails, staples, adhesives or the like. In many instances, there is a need for a temporary table, work surface or display surface that may be easily assembled and disassembled. It is highly desirable that such temporary tables or work surfaces be relatively lightweight, easily stored and quickly assembled.

The present invention provides a support for a table, platform or the like that facilitates quick assembly and disassembly of a table or platform and provides a support that is lightweight, rigid, and easily stored.

SUMMARY OF THE INVENTION

In accordance with a preferred embodiment of the present invention, there is provided a molded, plastic support having an upper end and a lower end. The upper end has an outer profile and is molded to have a pair of intersecting, rectangular slots formed therein. The lower end has an outer profile greater than the outer profile of the upper end, wherein the support tapers outwardly from the upper end to the lower end. The support is hollow, and the lower end is open to expose a hollow inner cavity. The support has a height of at least 20 inches.

In accordance with another embodiment of the present invention, there is provided a molded, plastic support having a generally pyramidal shape with a truncated upper end. A pair of intersecting rectangular slots are formed in the upper end of the support. The support has a generally uniform wall thickness and is open at a lower end to define a hollow inner cavity.

It is an object of the present invention to provide a support for a table, platform or the like.

It is another object of the present invention to provide a support as described above that is formed of a molded polymer material.

A still further object of the present invention is to provide a support as described above that is hollow and has an opened lower end, wherein a plurality of such supports may be stacked one upon another.

A still further object of the present invention is to provide a support as described above further including a base section matable with the support for vertically elevating and maintaining the support.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 6 is an exploded, perspective view of a frame, support and base section;

FIG. 7 is a sectional view of two supports, illustrating how such supports may be stored by nesting, i.e., stacking, one support on another;

FIG. 8 is a sectional view of two base sections, illustrating how two such base sections may be used or stored by stacking one base section on another; and FIG. 9 is an exploded, perspective view of a support and base section, illustrating another embodiment of the present invention.

DETAILED DESCRIPTION OF PREFERRED EMBODIMENT

Figure 1:
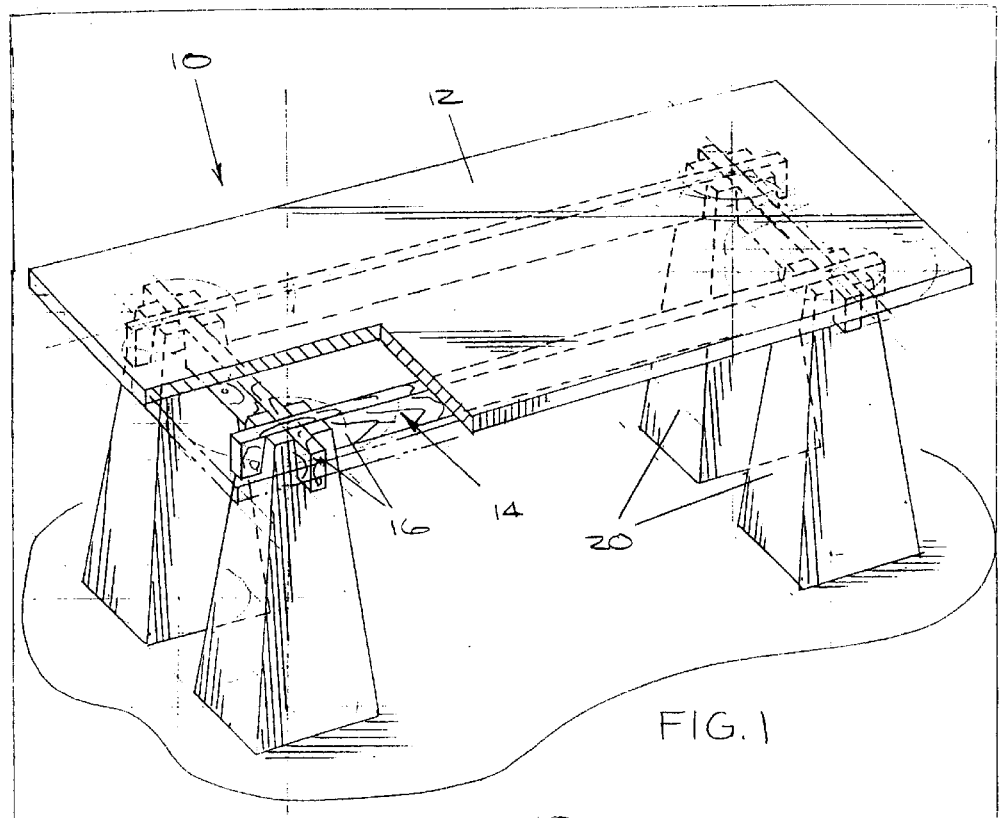
FIG. 1 is a partially sectioned, perspective view of a table assembly formed using supports, illustrating a preferred embodiment of the present invention.
Figure 2:
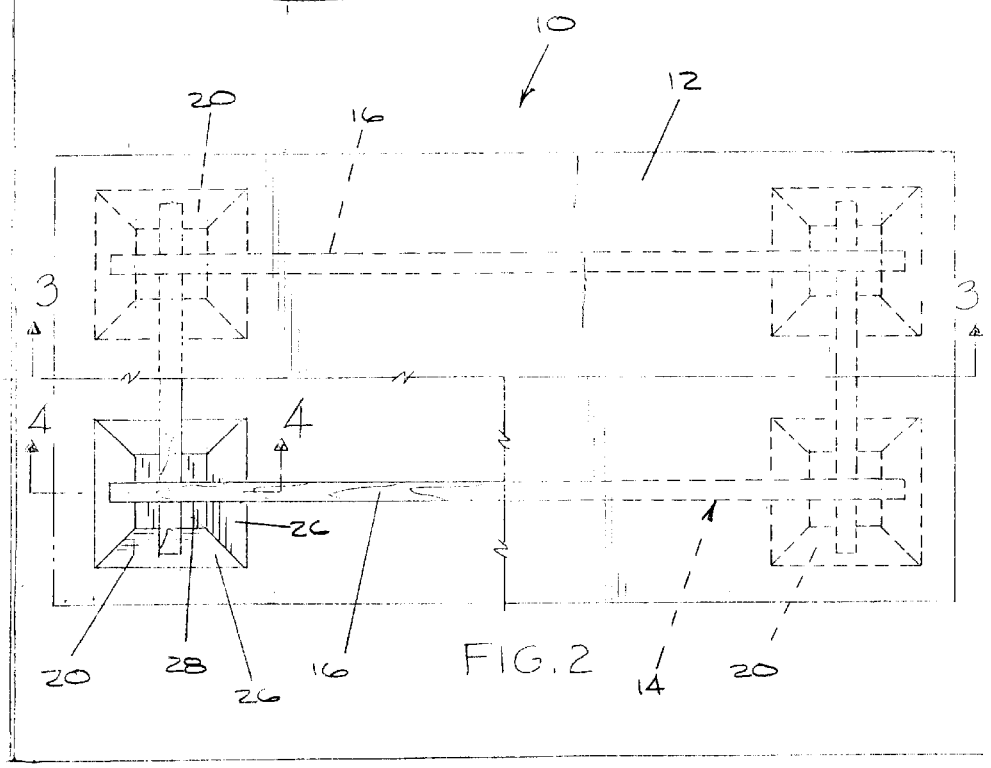
FIG. 2 is a partially sectioned, top plan view of the table assembly shown in FIG. 1.
Figure 3:
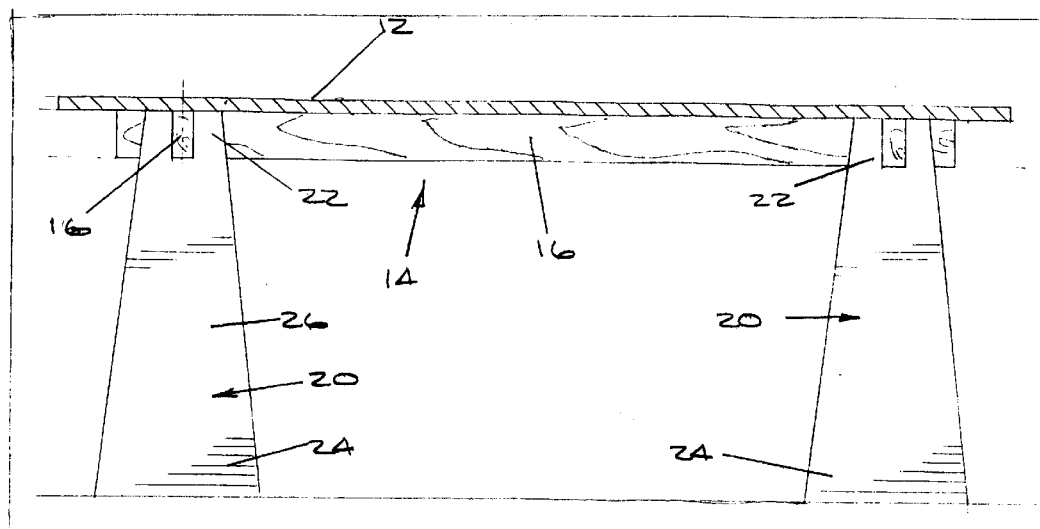
FIG. 3 is a sectional view taken along lines 3—3 of FIG. 2.

Referring now to the drawings wherein the showings are for the purpose of illustrating preferred embodiments of the invention only, and not for the purpose of limiting same, FIG. 1 shows a table assembly 10. Table assembly 10 is comprised of a rectangular sheet 12 supported on a rectangular frame 14 that is formed from elongated, structural members 16. A plurality of supports 20 support frame 14 and sheet 12.

Sheet 12 is preferably formed of a rigid, flat material, such as wood, plywood, particle board, and the like. Structural members 16 that form frame 14 are preferably comprised of standard, structural lumber, such as by way of example and not limitation, 2×4's, 2×6's or 2×8's. In this respect, the foregoing structural lumber each has a width "W" that measures approximately ½.

Figures 4, 5:
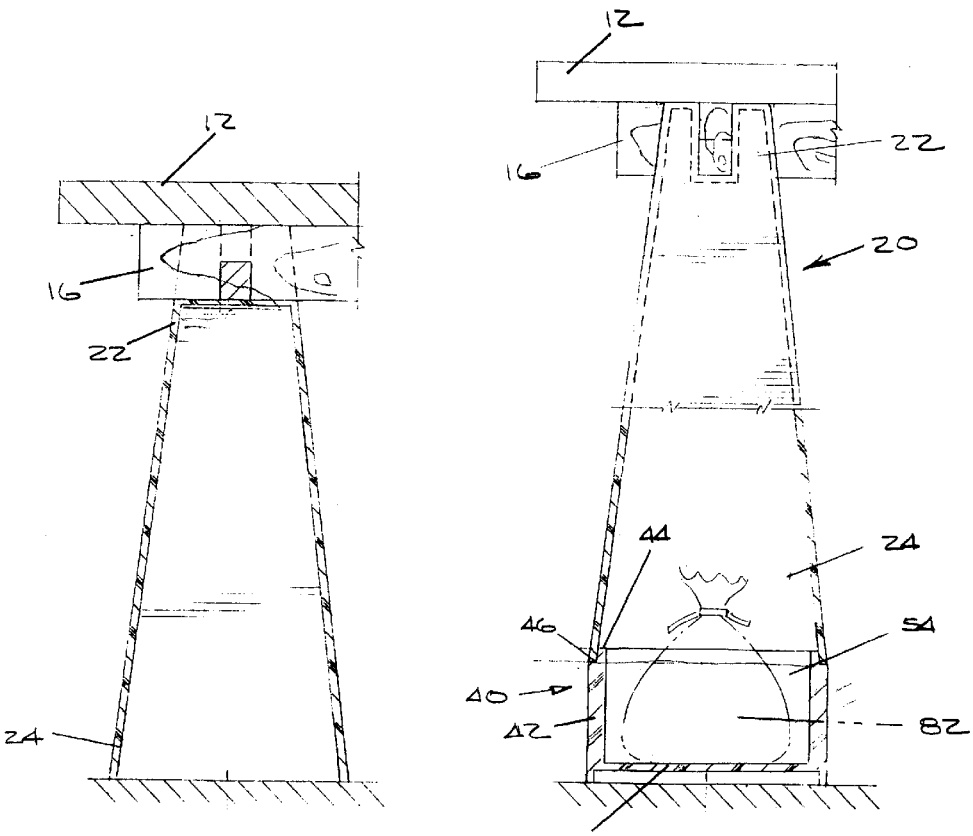
FIG. 4 is a sectional view taken along lines 4—4 of FIG. 2.
FIG. 5 is a sectional view of a support and a base section in matingly engagement with the bottom of the support.

Each support 20 has an upper end 22 and a lower end 24 (see FIG. 4). Support 20 is dimensioned to have a tapered shape wherein support 20 flares outwardly from upper end 22 towards lower end 24. In the embodiment shown, support 20 has a generally pyramidal shape and has four (4) sides designated 26. The generally pyramidal shape of support 20 is truncated to define a generally flat surface 28 at upper end 22 (see FIG. 6). Two intersecting slots 32, 34 are formed in surface 28 of upper end 22. Slots 32, 34 are preferably mutually perpendicular. Slots 32, 34 are rectangular in cross-section, and dimensioned to receive conventional, structural lumber, i.e., a 2×4, a 2×6 or a 2×8 standard piece of lumber. In this respect, slots 32, 34 each have a width "W" that measures at least 1½ inches and a depth "D" that measures at least 3½ inches, i.e., the dimensions of a standard 2×4 plank.

Support 20 is formed of a tough, rigid, thermosetting or thermoplastic polymer material, such as by way of example and not limitation, a filled or unfilled thermoplastic olefin-based polymer, such as polypropylene or polyethylene. Other suitable thermoplastic polymers may include filled or unfilled engineering thermoplastics, such as KEVLAR®.

Fillers may include, by way of example and not limitation, calcium carbonate or oxides of titanium. Fillers may also include colorants to color support 20. Support 20 is preferably formed by a molding process, such as injection molding, wherein support 20 is integrally formed and is generally hollow, as best illustrated in FIG. 4. In this respect, support 20 has a generally uniform wall thickness. Support 20 is thus "opened" at lower end 24. Lower end 24 has a flat, square, frame-like profile.

In accordance with another aspect of the present invention, a base section 40 is provided for mating attachment with the lower end 24 of support 20, as best seen in FIG. 5. In the embodiment shown, base section 40 is rectangular in shape and has an outer profile generally conforming to the outer profile of lower end 24 of support 20. In the embodiment shown, base section 40 is square and defined by four (4) wall sections 42a, 42b, 42c and 42d (see FIGS. 6 and 8) that together form a box-like structure. The upper edges of wall sections 42a, 42b, 42c and 42d are formed to define short curb sections 44a, 44b, 44c and 44d and upward facing, flat surfaces 46a, 46b, 46c (not shown in the drawings) and 46d. Surfaces 46a, 46b, 46c and 46d are dimensioned to support lower end 24 of support 20, as best seen in FIG. 5. Curb sections 44a, 44b, 44c and 44d position support 20 on surfaces 44a, 44b, 44c and 44d by being disposed along the inner edge of lower end 24, as best seen in FIG. 5. In other words, curb sections 44a, 44b, 44c and 44d are dimensioned to be received within the opening defined by lower end 24 of support 20, such that base section 40 mates with lower end 24 of support 20. A bottom wall section 48 extends between wall sections 42a, 42b, 42c and 42d. As best seen in FIGS. 5 and 8, bottom wall section 48 is disposed above the lower ends of wall sections 42a, 42b, 42c and 42d. Wall sections 42a, 42b, 42c and 42d and bottom wall 48 define a rectangular cavity 54 within base section 40. As best seen in FIG. 8, base section 40 is dimensioned such that a base section 40 may be stacked upon another base section 40. In other words, one or more base sections 40 may be mated with a support 20 to elevate, i.e., raise, support 20 to a predetermined distance off a floor surface.

Support 20 may be dimensioned to have any height. If support 20 is intended to be used with platform 12 and frame 14 to form a work surface, table top or the like, support 20 preferably has a minimum height of about 20 inches, and more preferably, has a height of about 22 inches, wherein a standard 2×4 plank positioned within slots 32, 34 and having platform 12 formed of a ¾ inch sheet material, would form a counter top, wherein the upper surface of platform 12 would reach a height of 24 inches, which is a generally standard height for low tables, vanities and the like. Base section 40 preferably has a height dimension "H" of about 6 inches, wherein the addition of a base section 40 to a support 20 would provide an overall height of about 30 inches, which is another generally standard height for tabletops, desks and the like. It will, of course, be appreciated by those skilled in the art that support 20 may be formed to have an overall height, wherein an additional base section 40 is not required to obtain a work surface height of 30". In other words, the height of support 20 may vary to obtain any desired work surface height.

By way of operation, four supports 20 may be used to form a table by spacing supports 20 at the four corners of the table. Standard 2×4, 2×6 or 2×8 lumber planks 16 are used to form a frame 14. The ends of the lumber planks 16 may include notches 62, as illustrated in FIG. 6, to form interlocking pieces at right angles to each other. Frame 12 is positioned to rest within slots 32, 34 of supports 20, as shown in FIG. 1. Alternately, one end of a structural member may be butted against another structural member and fastened thereto by screws, nails or the like. In this respect, the method of assembly of frame 14, in and of itself, forms no part of the present invention, and is described merely for the purpose of background. With structural frame 14 assembled and supported by supports 20, a tabletop 12 formed of a sheet material, such as a plywood sheet, may be placed upon frame 14, and if desired, attached thereto by conventional fasteners. Supports 20 provide the structural support necessary to form the table 10 or countertop.

As indicated above, the height of the table or platform 10 may be elevated through the use of base section 40. In one respect, cavities 54 formed in base sections 40 provide a space wherein weight, such as stones, bricks or metal plates, may be inserted to provide better stability and balance to support 20 and base section 40. FIG. 5 illustrates how a bag 82 of sand or gravel may be inserted within cavity 54 of base section 40.

Since support 20 and base section 40 are formed of a molded, polymer construction, they are lightweight and easy to handle. Still further, the hollow pyramidal shape of support 20 allows stacking of a plurality of supports 20 one upon another in a nesting fashion, as illustrated in FIG. 7. Thus, supports 20 and base sections 40 may be conveniently and easily stored by stacking one upon another.

The present invention thus provides a convenient, quick and lightweight support for a table, work surface or display surface, which supports are lightweight, easily managed and easily stored.

The present invention has been described heretofore with respect to a pyramidal shaped support 20. As will be appreciated, support 20 may assume other shapes that flare from the upper end outward to the lower end, such as a conical shape, an elliptical shape and the like. Base section 40 conforming to such shapes can also be formed. For example, FIG. 9 shows a conical support 20' and a conical base section 40', illustrating another embodiment of the present invention.

The foregoing description is a specific embodiment of the present invention. It should be appreciated that this embodiment is described for purposes of illustration only, and that numerous alterations and modifications may be practiced by those skilled in the art without departing from the spirit and scope of the invention. For example, although the drawings depict a table assembly 10 supported by four (4) supports 20, it will be appreciated that four (4) or more supports 20 may be used to support large table assemblies 10. It is intended that all such modifications and alterations be included insofar as they come within the scope of the invention as claimed or the equivalents thereof.

What is claimed is:

1. A molded, plastic support having an upper end and a lower end, said upper end having an outer profile and being molded to have a pair of intersecting, mutually perpendicular, rectangular slots formed therein, said lower end having an outer profile greater than said outer profile of said upper end, wherein said support tapers outwardly from said upper end to said lower end, said support being formed to have a generally uniform wall thickness and said lower end being open to expose a hollow inner cavity, wherein said support is stackable onto another like support, said support having a height of at least 20 inches.

2. A molded, plastic support as defined in claim 1, wherein said support is formed to be symmetrical about a central axis extending through said support from said upper end to said lower end.

3. A molded, plastic support as defined in claim 1, wherein said support is pyramidal in shape.

4. A molded, plastic support as defined in claim 1, wherein said support is conical in shape.

5. A molded, plastic support as defined in claim 1, wherein said support is injection molded to have a generally uniform wall thickness.

6. A molded, plastic support as defined in claim 1, further comprising a molded polymer base section dimensioned to attach to said lower end of said support, said base section having an outer surface profile conforming to the outer profile of the lower end of said support, and said base section having a cavity formed therein, said cavity in said base section communicating with said hollow inner cavity in said support when said base section is attached to said support, said cavity in said base section defining space for weights to stabilize said support and base section.

7. A molded, plastic support as defined in claim 1, wherein said support is formed of a thermoplastic.

8. A molded, plastic support as defined in claim 7, wherein said support is injection molded.

9. A molded, plastic support as defined in claim 7, wherein said thermoplastic is polyolefin.

10. A molded, plastic support as defined in claim 9, wherein said polyolefin is polyethylene or polypropylene.

11. A molded, plastic support as defined in claim 7, wherein said thermoplastic is a filled thermoplastic.

12. A molded, plastic support as defined in claim 11, wherein said filled thermoplastic includes a colorant.

13. A molded, plastic support having a generally pyramidal shape with a truncated upper end, a pair of intersecting rectangular slots formed in said upper end, said support having a generally uniform wall thickness and being open at a lower end to define a hollow inner cavity wherein said support is stackable onto another like support.

14. A molded, plastic support as defined in claim 13, wherein said slots are mutually perpendicular and measure at least 1½ inches in width and 3½ inches in depth.

15. A molded, plastic support as defined in claim 14, wherein said support is injection molded.

16. A molded, plastic support as defined in claim 14, wherein said support is formed of a thermoplastic.

\* \* \* \* \*